US009654668B2

United States Patent
Hosono et al.

(10) Patent No.: US 9,654,668 B2
(45) Date of Patent: May 16, 2017

(54) IMAGE COMPOSITION APPARATUS AND IMAGE COMPOSITION METHOD

(71) Applicant: Olympus Corporation, Hachioji-shi, Tokyo (JP)

(72) Inventors: Kazuya Hosono, Chofu (JP); Hiroaki Iwasaki, Hino (JP); Takayuki Matsuhashi, Hino (JP); Manabu Ichikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/590,805

(22) Filed: Jan. 6, 2015

(65) Prior Publication Data
US 2015/0206296 A1   Jul. 23, 2015

(30) Foreign Application Priority Data

Jan. 17, 2014   (JP) .................................. 2014-006804

(51) Int. Cl.
*G06T 5/10* (2006.01)
*H04N 1/60* (2006.01)
*G06T 5/50* (2006.01)

(52) U.S. Cl.
CPC ............. *H04N 1/6002* (2013.01); *G06T 5/50* (2013.01); *H04N 1/6027* (2013.01); *G06T 2207/10024* (2013.01); *G06T 2207/20221* (2013.01); *G06T 2207/20224* (2013.01)

(58) Field of Classification Search
CPC ....... G06T 5/50; H04N 5/23229; H04N 5/235; H04N 5/357–5/3675; H04N 1/6002; H04N 1/6027
See application file for complete search history.

(56) References Cited

U.S. PATENT DOCUMENTS

| 2001/0036231 | A1* | 11/2001 | Easwar ................... G06T 9/007 375/240.19 |
| 2002/0146169 | A1* | 10/2002 | Sukthankar ............... G06K 9/20 382/170 |
| 2002/0150306 | A1* | 10/2002 | Baron .................. H04N 5/2354 382/275 |
| 2006/0269155 | A1* | 11/2006 | Tener .................... G06T 3/4038 382/243 |

(Continued)

FOREIGN PATENT DOCUMENTS

| JP | 2000-261715 | 9/2000 |
| JP | 2004-056395 | 2/2004 |

(Continued)

*Primary Examiner* — Sean Motsinger
(74) *Attorney, Agent, or Firm* — John C. Pokotylo; Straub & Pokotylo

(57) ABSTRACT

An image composition apparatus according to the present invention comprising: an image acquiring section for acquiring first image data and second image data; a subtraction processing section for obtaining a difference value for each pixel for at least a part of the first image data and at least a part of the second image data; a filter processing section for applying filter processing based on a spatial frequency of an image to the difference value; and an image composition section for compositing at least a part of the first image data with at least a part of the second image data on the basis of an output of the filter processing.

17 Claims, 10 Drawing Sheets

(56) References Cited

U.S. PATENT DOCUMENTS

| | | | | |
|---|---|---|---|---|
| 2007/0110417 | A1* | 5/2007 | Itokawa | G06T 5/50 396/52 |
| 2008/0050031 | A1* | 2/2008 | Itoh | G06T 5/50 382/260 |
| 2008/0069433 | A1* | 3/2008 | Corcoran | G06K 9/40 382/149 |
| 2010/0053374 | A1* | 3/2010 | Otsuki | H04N 5/23212 348/231.99 |
| 2010/0157078 | A1* | 6/2010 | Atanassov | G06T 5/007 348/222.1 |
| 2010/0290714 | A1* | 11/2010 | Toyoda | H04N 1/4072 382/264 |
| 2012/0008005 | A1* | 1/2012 | Fukunishi | H04N 5/145 348/222.1 |
| 2012/0044379 | A1* | 2/2012 | Manabe | H04N 5/2354 348/222.1 |
| 2013/0038761 | A1* | 2/2013 | Tanaka | H04N 5/35563 348/242 |
| 2014/0232904 | A1* | 8/2014 | Na | H04N 5/23229 348/239 |
| 2015/0221066 | A1* | 8/2015 | Kobayashi | G06T 11/00 382/284 |

FOREIGN PATENT DOCUMENTS

| | | |
|---|---|---|
| JP | 2005-117395 | 4/2005 |
| JP | 2005-341463 | 12/2005 |

* cited by examiner

FIG. 7A

| 1  | 8   | 14  | 8   | 1  |
|----|-----|-----|-----|----|
| 8  | 64  | 112 | 64  | 8  |
| 14 | 112 | 196 | 112 | 14 |
| 8  | 64  | 112 | 64  | 8  |
| 1  | 8   | 14  | 8   | 1  |

FIG. 7B

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

IMAGE 1

IMAGE 2 (BEFORE CORRECTION)

IMAGE 2 (AFTER CORRECTION)

FIG. 11A

FOR R/B

| 17 | 0 | 32 | 0 | 17 |
|---|---|---|---|---|
| 0 | 0 | 0 | 0 | 0 |
| 32 | 0 | 60 | 0 | 32 |
| 0 | 0 | 0 | 0 | 0 |
| 17 | 0 | 32 | 0 | 17 |

FOR Gr/Gb

| 10 | 0 | 19 | 0 | 10 |
|---|---|---|---|---|
| 0 | 26 | 0 | 26 | 0 |
| 19 | 0 | 36 | 0 | 19 |
| 0 | 26 | 0 | 26 | 0 |
| 10 | 0 | 19 | 0 | 10 |

FIG. 11B

FOR R

| 4 | 12 | 7 | 12 | 4 |
|---|---|---|---|---|
| 12 | 4 | 22 | 4 | 12 |
| 7 | 22 | 12 | 22 | 7 |
| 12 | 4 | 22 | 4 | 12 |
| 4 | 12 | 7 | 12 | 4 |

FOR B

| 1 | 12 | 3 | 12 | 7 |
|---|---|---|---|---|
| 12 | 10 | 22 | 10 | 6 |
| 3 | 22 | 5 | 22 | 14 |
| 12 | 10 | 22 | 10 | 6 |
| 1 | 12 | 3 | 12 | 7 |

FOR Gr/Gb

| 7 | 6 | 14 | 6 | 4 |
|---|---|---|---|---|
| 2 | 19 | 4 | 19 | 12 |
| 14 | 11 | 27 | 11 | 7 |
| 2 | 19 | 4 | 19 | 12 |
| 7 | 6 | 14 | 6 | 4 |

FIG. 11C

FILTER WITH EMPHASIS ON UPPER LEFT

| 18 | 14 | 34 | 0 | 0 |
|---|---|---|---|---|
| 14 | 23 | 27 | 0 | 0 |
| 34 | 27 | 65 | 0 | 0 |
| 0 | 0 | 0 | 0 | 0 |
| 0 | 0 | 0 | 0 | 0 |

FILTER WITH EMPASIS ON LOWER RIGHT

| 0 | 0 | 0 | 0 | 0 |
|---|---|---|---|---|
| 0 | 0 | 0 | 0 | 0 |
| 0 | 0 | 59 | 25 | 31 |
| 0 | 0 | 25 | 43 | 13 |
| 0 | 0 | 31 | 13 | 16 |

IMAGE COMPOSITION APPARATUS AND IMAGE COMPOSITION METHOD

Benefit is claimed, under 35 U.S.C. §119, to the filing date of prior Japanese Patent Application No. 2014-6804 filed on Jan. 17, 2014. This application is expressly incorporated herein by reference. The scope of the present invention is not limited to any requirements of the specific embodiments described in the application.

BACKGROUND OF THE INVENTION

1. Field of the Invention

The present invention relates to an image composition apparatus, an image composition method, and a program in which an influence of a sudden pixel defect is eliminated in compositing a plurality of pieces of image data.

2. Description of Related Art

Recently, various image composition apparatuses for compositing images of a plurality of pieces of image data are proposed such as an image pickup apparatus which acquires a plurality of pieces of image data at a predetermined time interval and accumulates and adds/composites the plurality of pieces of image data so that a photographed image is monitored during bulb photographing (see Japanese Patent Laid-Open No. 2005-117395 (hereinafter referred to as Patent Literature 1), for example), an image composition apparatus in which brightness of each pixel of the plurality of pieces of image data is compared, the brightness of the pixel with a high brightness level is selected, and image composition is performed (see Japanese Patent No. 4148586 (hereinafter referred to as Patent Literature 2), for example) and the like.

There is a defective pixel in an image pickup element, and a bright point or a black point remains in the image at a position of the defective pixel regardless of an object. The defective pixels are not limited to the pixels in which defects occur at all times but include a defective pixel in which a defect does not occur at all times but suddenly occurs.

Various technologies for eliminating an influence of such defective pixels have been proposed. For example, in an image composition apparatus disclosed in Japanese Patent Laid-Open No. 2004-056395 (hereinafter referred to as Patent Literature 3), a plurality of images is photographed, and a position of a suddenly occurring defective pixel (defective pixel which does not occur at all times) is detected from these plurality of images and recorded in a memory. An image composition apparatus disclosed in Japanese Patent No. 4349207 (hereinafter referred to as Patent Literature 4) uses a previous frame image, calculates an average value of those in the same color and adjacent to a pixel of interest, compares it using a threshold value, and corrects/calculate a level of the pixel of interest on the basis of this comparison result.

SUMMARY OF THE INVENTION

The present invention has an object to provide an image composition apparatus and an image composition method which can efficiently detect and eliminate an influence of a pixel defect even if there is a sudden pixel defect.

An image composition apparatus according to the present invention comprising: an image acquiring section for acquiring first image data and second image data; a subtraction processing section for obtaining a difference value for each pixel for at least a part of the first image data and at least a part of the second image data; a filter processing section for applying filter processing based on a spatial frequency of an image to the difference value; and an image composition section for compositing at least a part of the first image data with at least a part of the second image data on the basis of an output of the filter processing.

Another image composition apparatus according to the present invention comprising: an image acquiring section for acquiring first image data and second image data; a filter processing section for applying filter processing based on a spatial frequency to the first image data and the second image data; and a subtraction processing section for obtaining a difference value for each pixel for at least a part of an output of the filter processing of the first image data and a filter output of the second image data by the filter processing section; and an image composition section for compositing at least apart of the first image data with at least a part of the second image data on the basis of the difference value.

An image composition method according to the present invention comprising: an image acquiring step of acquiring first image data and second image data; a difference value acquiring step of acquiring a difference value for each pixel for at least a part of the first image data and at least a part of the second image data; a filter processing step of applying filter processing based on a spatial frequency of an image to the difference value; and a composition step of compositing at least a part of the first image data with at least a part of the second image data on the basis of the difference value and a result of the filter processing.

BRIEF DESCRIPTION OF THE DRAWINGS

FIGS. 7A and 7B are views illustrating examples of filter processing of the camera according to the first embodiment of the present invention;

FIGS. 11A to 11C are views for illustrating another example of the filter processing of the camera according to the first embodiment of the present invention.

DETAILED DESCRIPTION OF THE PREFERRED EMBODIMENTS

Preferred embodiments will be described below by using a camera to which the present invention is applied. The camera according to the preferred embodiment of the present invention is a digital camera which roughly displays a live view of image data based on the image data readout of an image pickup element (image sensor 4) on a display section and records the image data subjected to image processing for recording in an external memory in accordance with an operation of a release button. Moreover, if a lighten composite mode is set, plural sessions of photographing are made continuously, brightness of a corresponding pixel (pixel at the same position) are compared, and if it is bright, it is replaced by image data of a pixel of interest, while if it is not bright, the image data of the pixel of interest is not replaced, but image composition (this is referred to as lighten composite) is performed.

When the lighten composite is performed, if a level of brightness of the pixel of interest is higher than a comparison composite image, a level of peripheral pixels is checked, and if there is no bright pixel, the image data of the pixel of interest is not replaced. In general, even in an object with a single bright point such as a star, not only one pixel becomes bright but some pixels around it become bright. If the brightness level of only one pixel is high, it can be considered as a sudden pixel defect, and it is not used for image composition.

Figure 1:
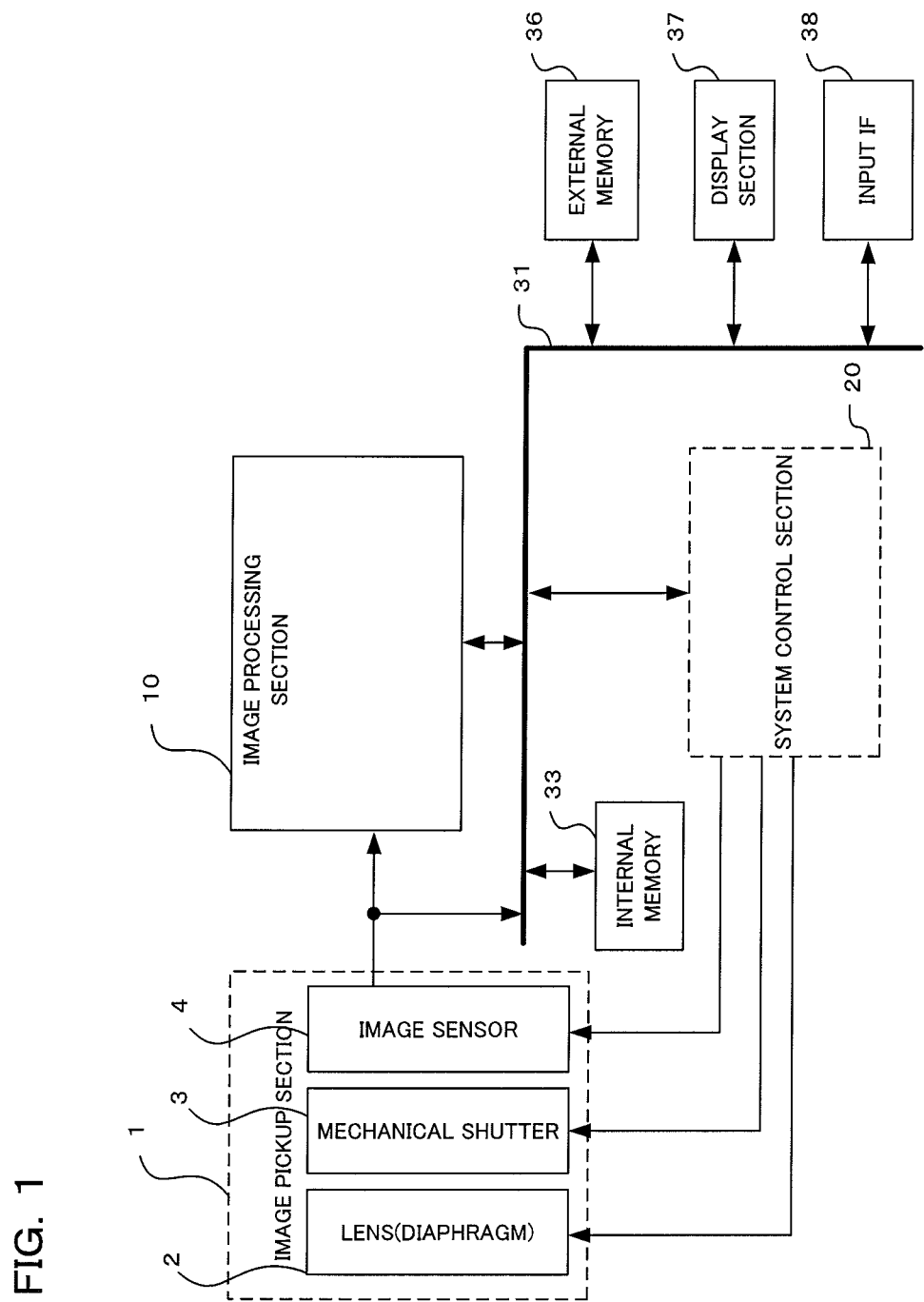
FIG. 1 is a block diagram mainly illustrating an electric configuration of a camera according to a first embodiment of the present invention.

FIG. 1 is a block diagram mainly illustrating an electric configuration of a camera according to a first embodiment as a preferred embodiment of the present invention. The camera in this embodiment has an image pickup section 1, an image processing section 10, a system control section 20, and a bus 31 and each section connected thereto. In this embodiment, a lens 2 is constituted integrally with a camera body but it may naturally be a replacement lens.

In the image pickup section 1, the lens 2, a mechanical shutter 3, and an image sensor 4 are provided. The lens 2 forms an optical image of an object on an image pickup surface of the image sensor 4. The lens 2 functions as an optical system for forming an object image. In this lens 2, a diaphragm for determining a diaphragm stop for adjusting an exposure amount is provided. Moreover, the mechanical shutter 3 performs exposure or shielding of light with respect to the image sensor 4 by an opening/closing operation and controls a shutter speed.

The image sensor 4 includes image pickup elements such as a CMOS image sensor and a CCD image sensor, converts an optical image of the object formed by the lens 2 to an electric signal for each pixel, and outputs image data to the image processing section 10 and the bus 31. The bus 31 is a signal line for transmission/reception of a signal between each of blocks. The mechanical shutter 3 and the image sensor 4 generate first image data (first image data is image data first generated on the basis of the image data read out of the image sensor 4 or a composite image composited by the image processing section 10) and second image data (image data generated lastly on the basis of the image data read out of the image sensor 4). The image pickup section 1 functions as an image pickup section which picks up an object image formed by the optical system and outputs it as the second image data.

The image processing section 10 applies image processing to the image data output from the image sensor 4. A detailed configuration of the image processing section 10 will be described later by using FIG. 2.

To the bus 31, an internal memory 33, an external memory 36, a display section 37, an input IF (interface) 38, and the system control section 20 are connected in addition to the above-described image processing section 10.

The internal memory 33 temporarily stores various types of setting information required for the camera operation and the image data in the middle of the image processing. The internal memory 33 is constituted by a nonvolatile memory such as a flash memory.

The external memory 36 is a nonvolatile recording medium that can be loaded into the camera body or can be fixed inside, such as an SD card and a CF card, for example. This external memory 36 is capable of recording the image data subjected to development processing in a development processing section 18 and during reproduction, the recorded image data is read out and can be output to an outside of the camera. The external memory 36 functions as a recording section for holding and outputting the image data. Moreover, the external memory 36 records image data composited by an image composition section 17 in the image processing section 10.

The display section 37 has a back display section such as a TFT (Thin Film Transistor) liquid crystal or an organic EL and an EVF (electronic view finder) and displays an image (including a live-view image) developed by the development processing section 18 in the image processing section 10. The display section 37 inputs and displays the image data composited by the image composition section 17 in the image processing section 10.

The input IF 38 has an operating member such as a release button and a touch panel or the like for inputting a touch operation on the back display section and the like and instructs various mode setting and photographing operations such as release on the basis of a user operation.

The system control section 20 has a CPU (Central Processing Unit) and executes entire control by controlling each section of the camera in accordance with a program stored in the internal memory 33.

Subsequently, a configuration of the image processing section 10 will be described using FIG. 2. The image processing section 10 has a recording section 11, an image acquiring section 12, a subtraction processing section 13, a numerical conversion section 14, a filter processing section 15, a composition determining section 16, the image composition section 17, a development processing section 18, and a color-space conversion section 19, and each of these sections is connected to the bus 31.

The recording section 11 is a nonvolatile or volatile memory capable of electric rewriting and temporarily stores image data when image processing is executed in the image processing section 10.

The image acquiring section 12 acquires the image data from the bus 31 or an outside of the image processing section 10. That is, the image acquiring section 12 acquires the image data from the image sensor 4 and the image data subjected to image processing by the image composition section 17 and the like. This image acquiring section 12 functions as an image acquiring section for acquiring the first image data and the second image data.

The subtraction processing section 13 calculates a difference in the image data of corresponding pixels by using two pieces of image data acquired by the image acquiring section 12. That is, the subtraction processing section 13 calculates sequentially the difference of the image data of the pixels for the whole of or a part of the image data. Moreover, the subtraction processing section 13 obtains a difference value for each pixel in the same color when subtraction processing is executed for the image data of an RGB pixel.

The subtraction processing section 13 functions as a subtraction processing section for obtaining the difference value for each pixel for at least a part of the first image data and for at least a part of the second image data. Here, subtraction may be made after adding predetermined different gains to the two pieces of image data in advance. By adding the different gains, how much importance is to be given to a sudden brightness change in photographing data can be adjusted in the composite image data and the image data obtained by photographing.

The numerical conversion section 14 converts the difference value calculated in the subtraction processing section 13. In this numerical conversion, conversion may be made by giving a value of "0" or "1" or the like in accordance with whether a threshold value is exceeded or not or in accordance with a function determined in advance, for example, or conversion may be made along a table determined in advance. An example of the numerical conversion will be described later by using FIG. 6A and FIG. 6B. The numerical conversion section 14 functions as a numerical conversion section which gives a numerical value on the basis of whether or not the difference value has exceeded a predetermined threshold value or gives a numerical value on the basis of a predetermined conversion characteristic based on the difference value.

The filter processing section 15 executes filter processing based on a spatial frequency of the image with respect to the difference value calculated by the subtraction processing section 13. That is, the filter processing section 15 applies the filter processing based on the spatial frequency of the image to the numerical value converted by the numerical conversion section 14. Moreover, the filter processing section 15 performs weighting according to a distance from the pixel to which the filter processing is applied (see FIG. 7A, for example).

When composition is to be performed by using at least a part of the first image data and at least a part of the second image data on the basis of the difference value subjected to the filter processing by the filter processing section 15, the difference value calculated by the subtraction processing section 13, or the like, the composition determining section 16 determines whether or not it is used for the composition processing for each pixel.

The image composition section 17 performs image composition by using the image data acquired by the image acquiring section 12. In performing this image composition, the composition processing is applied to the pixel determined to be used for the composition processing, while the composition processing is not applied to the pixel determined by the composition determining section 16 not to be used for the composition processing. This image composition section 17 functions as an image composition section for compositing at least a part of the first image data with at least a part of the second image data on the basis of the difference value and the filter processing output.

The image composition section 17 is capable of processing at least one of image processing using a plurality of images, such as normal composition, addition composition, addition/averaging composition, lighten composite, dodging composition, screen composition, overlay composition, and darken composite. Here, in the addition composition, in the case of bulb photographing, image data is read out at a predetermined time interval, the image data this time is added to addition image data of the previous time each time the image data is read out, and cumulative addition image data is generated, for example.

In the lighten composite, such image composition is performed that a plurality of images is photographed continuously, brightness of the corresponding pixel (the pixel at the same position) is compared, and if it is bright, the pixel of interest is replaced, while if it is not bright, the pixel of interest is not replaced. According to this lighten composite, a change of a moving bright portion such as a trajectory of stars in the night sky can be accommodated in one image.

In the darken composite, such image composition is performed that a plurality of images is photographed continuously, brightness of the corresponding pixel (the pixel at the same position) is compared, and if it is dark, the pixel of interest is replaced, while if it is not dark, the image data of the pixel of interest is not replaced. According to this darken composite, a moving bright portion is erased in a night scene and a starry sky and only a background image can be accommodated in an image.

In the addition/averaging composition, a plurality of images is photographed continuously, and the addition/averaging processing is applied to the corresponding pixel (the pixel at the same position). According to this addition/averaging composition, the moving object can be erased and only the background can be left by improving a ratio of the brightness level of the background according to the number of composited images regardless of the brightness of a moving object.

In the dodging composition, after the above-described lighten composite is performed, the pixel value is darkened so as to lower brightness and to make a new pixel value, and image composition is performed. In the screen composition, the pixel in the original image is reversed on the basis of the pixel of a new image and made a new pixel value, and image composition is performed. In the overlay composition, if the pixel of the original image is lighter than a predetermined value, the "dodging composition" is performed, while if it is darker, the "screen composition" is performed. In the normal composition, composition of overwriting the pixel of a new image on the pixel is performed. In the dodging composition, the screen composition, the overlay composition, and the normal composition, if a result of composition determination is applicable to the case of not performing composition, the pixel of the new image is not used for the composition.

The development processing section 18 executes conversion processing from RAW image data from the image sensor 4 and the image data image-composited by the image composition section 17 to an image for display and image data for recording such as JPEG and TIFF. At least one of the first and second image data acquired by the image acquiring section 12 is image data in Bayer array, and the development processing section 18 functions as a development processing section for applying interpolation processing to the image data in Bayer array.

The color-space conversion section 19 converts RGB image data to a brightness signal and a color-difference signal. That is, the RGB image data from an R pixel, a G pixel, and a B pixel is converted to image data of a component representing brightness (brightness Y) and a component (color difference (Cb, Cr)) representing a difference between two color signals and brightness signals. The color-space conversion section 19 functions as a color-space conversion section that obtains at least a brightness value of the pixel subjected to interpolation processing by the development processing section 18. In this case, the subtraction processing section 13 acquires the difference of the pixel values output by the development processing section 18 or acquires the difference of the brightness values for each pixel output by the color-space conversion section, which becomes a determination standard in the composition.

Subsequently, the lighten composite processed in the image composition section will be described by using FIG.

Figure 3:
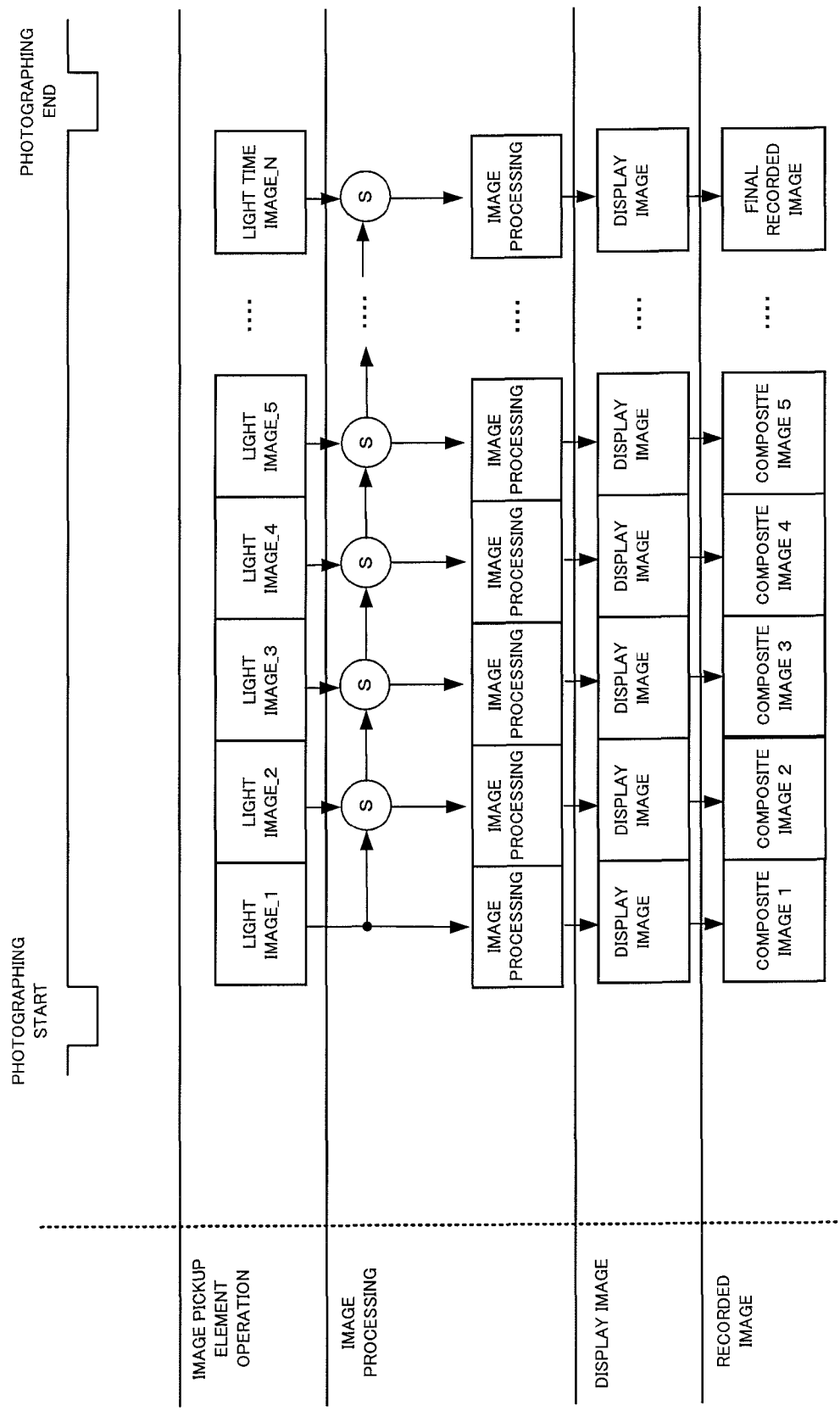
FIG. 3 is a timing chart illustrating an operation in lighten composite processing in the camera according to the first embodiment of the present invention.

3. In FIG. 3, processing timing is illustrated by a temporal change by the unit of frame. An uppermost tier in FIG. 3 illustrates timing of photographing start and photographing end. A next tier illustrates an operation of the image sensor 4 (image pickup element) and its next tier illustrates a temporal change of image processing (lighten composite processing). In this tier, "S" indicates the lighten composite processing. The next tier of the image processing illustrates a temporal change of a display image, and the next tier of the display image (a lowermost tier in FIG. 3) illustrates a temporal change of a recorded image.

In FIG. 3 illustrating the lighten composite processing, when photographing is started, a light image 1 is acquired. When the light image 1 is acquired, the image processing section 10 executes image processing (development processing for live view display and the like) and displays the image subjected to image processing on the display section 37 or stores it as a composite image 1 in the internal memory 33 or the recording section 11. Subsequently, when a light image _2 is acquired at timing of the next frame, the lighten composite processing is executed by using the light image _1 and the light image _2, the image processing section 10 performs image processing (development processing for live view display) on this image data subjected to the lighten composite processing and displays it on the display section 37 or stores it as a composite image 2 in the internal memory 33 or the recording section 11. Each time a light image is acquired subsequently, the similar processing is executed, and when the photographing is finished, a composite image _N subjected to the lighten composite processing by using the composite image stored immediately before is displayed and recorded for the light image _N acquired lastly.

Subsequently, an operation in this embodiment will be described by using a flowchart illustrated in FIG. 4. This operation is performed by the CPU in the system control section 20 by controlling each section in accordance with the program stored in the internal memory 33.

Figure 4:
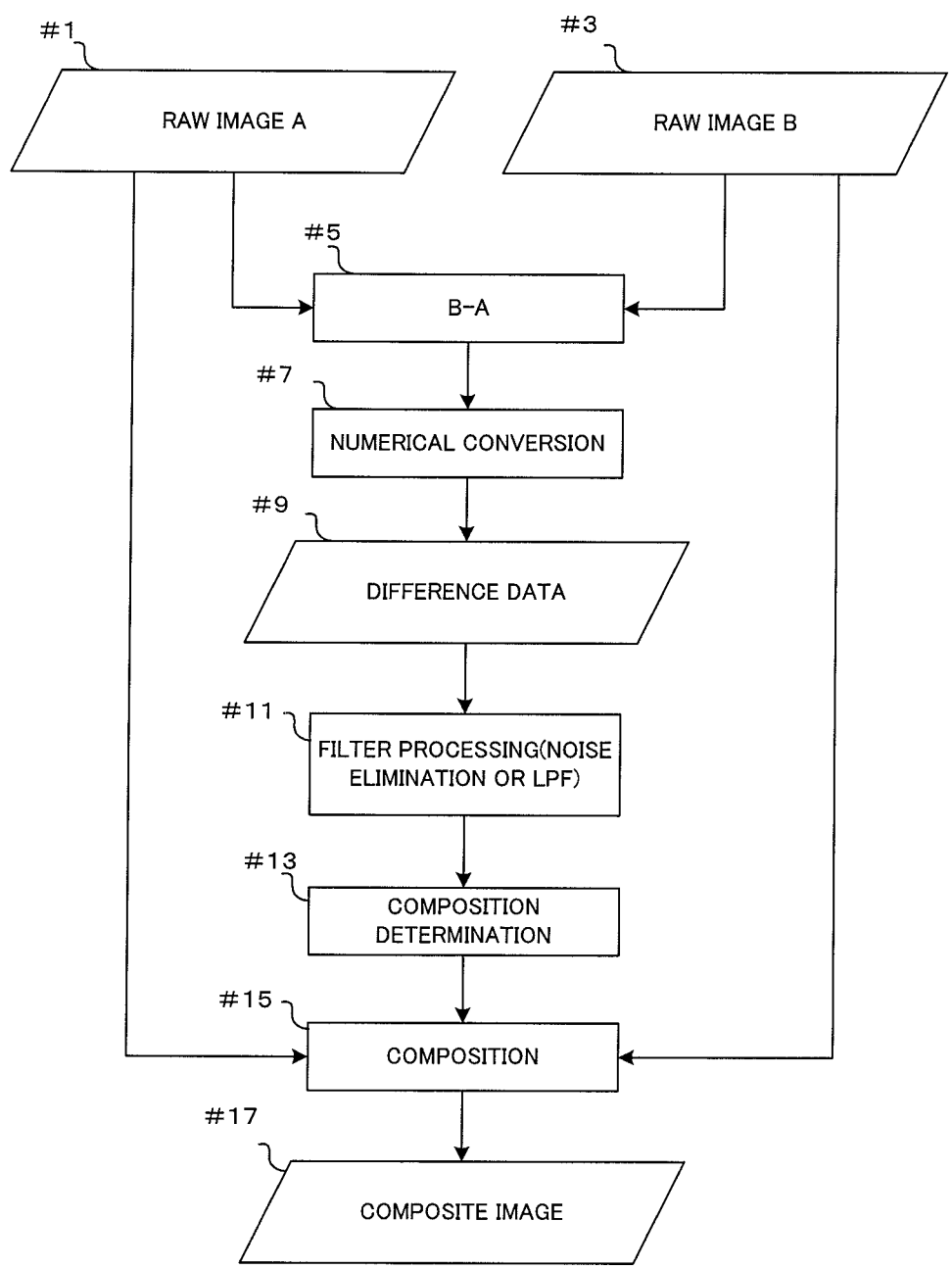
FIG. 4 is a flowchart illustrating an operation of the camera according to the first embodiment of the present invention.

In the flowchart illustrated in FIG. 4, first, the image acquiring section 12 acquires a RAW image A (#1) and also acquires a RAW image B(#3). Here, the RAW image A is image data composited by the image composition section 17. Therefore, the RAW image A is image data after the second image data is read out of the image sensor 4. The RAW image B is image data read out of the image sensor 4 or the image data composited by the image composition section 17.

When the RAW image data is acquired at Steps #1 and #3, then, a difference (B−A) between the RAW image data B and the RAW image data A is calculated (#5). Here, the subtraction processing section 13 obtains a difference value for each pixel at the same position of the respective pieces of image data for the RAW image data A and B acquired by the image acquiring section 12.

Figure 6A:
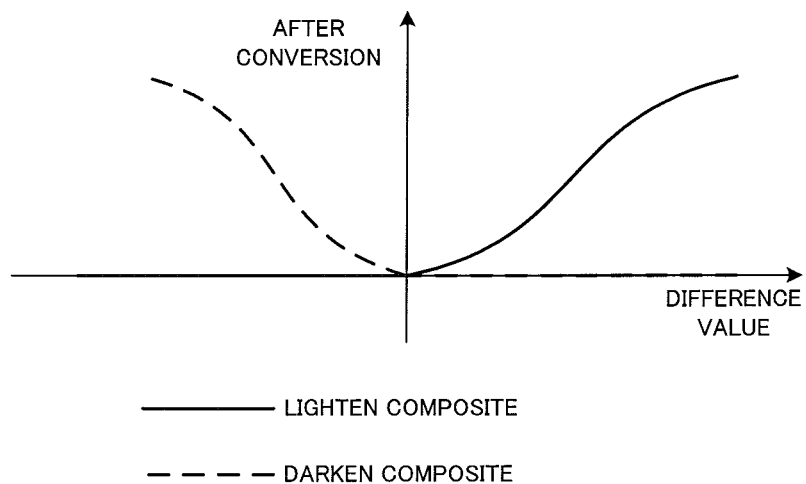
FIGS. 6A and 6B are views illustrating examples of numerical conversion of the camera according to the first embodiment of the present invention.
Figure 6B:
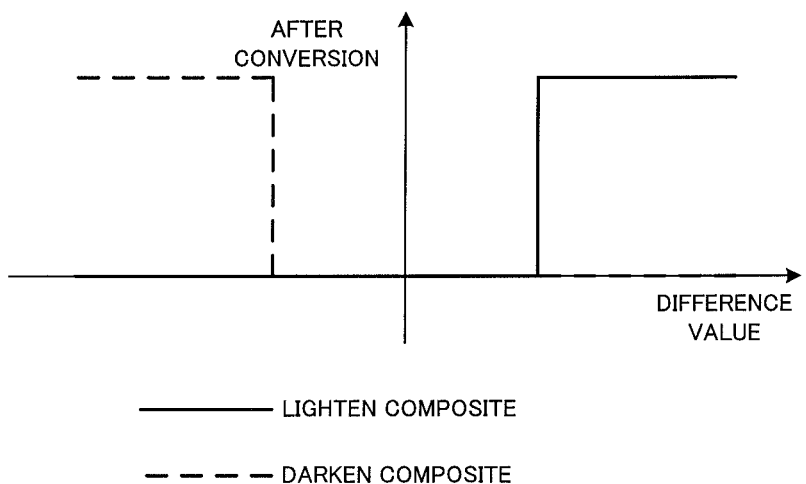

When the difference value for each pixel of the image data is obtained, then, numerical conversion is performed (#7). Here, the numerical conversion section 14 performs numerical conversion by using the difference value calculated by the subtraction processing section 13. In this numerical conversion, as illustrated in FIG. 6A and FIG. 6B, for example, the value is converted to a converted value (indicated on the y-axis) according to the difference value (indicated on the x-axis). In the example illustrated in FIG. 6A, in the case of lighten composite, when the difference value is positive, the converted value gradually increases and forms a curve saturated beyond a predetermined value, while in the case of darken composite, when the difference value is negative, the converted value increases and forms a curve saturated beyond a predetermined value.

In the example illustrated in FIG. 6B, in the case of lighten composite, when the difference value is at a predetermined value or more, the converted value is a predetermined value (constant value), while when the difference value is at a predetermined value or less, the converted value is zero. In the case of darken composite, when the difference value is at a predetermined value or less, the converted value is a predetermined value (constant value), while when the difference value is at a predetermined value or more, the converted value is zero. FIG. 6A and FIG. 6B are examples of conversion from the difference value to the converted value, and it may be so configured that an arbitrary shape is obtained by using various functions.

When numerical conversion is performed at Step #7, difference data is acquired (#9). At Steps #5 and #7, a difference value of the image data is calculated for each corresponding pixel, and since the numerical conversion has been performed, data after the numerical conversion for each pixel is sequentially stored in the internal memory 33 or in the recording section 11 at this Step.

When the difference data is acquired at Step #9, then, filter processing is executed (#11). Here, the filter processing section 15 executes filter processing based on the spatial frequency of the image for the difference value of the RAW image data A and the RAW image data B. Specifically, filter processing such as noise elimination and LPF (Low Pass Filter) is executed. The filter processing may be executed by using image data of 5×5 pixels on front and rear and right and left of the pixel for which the filter processing is to be executed as illustrated in FIG. 7A and FIG. 7B, for example.

In the example illustrated in FIG. 7A, weighting is performed in accordance with a distance from the pixel subjected to the filter processing. In this example, the pixel (pixel of interest) subjected to the filter processing is at a position of (3, 3), weighting of the image data at this position is 196, the weighting of the image data of the pixel (1, 1) is 1, the weighting of the image data of the pixel (2, 1) is 8, the weighting of the image data of the pixel (3, 1) is 14, . . . .

In the example illustrated in FIG. 7B, uniform weighting is performed within a predetermined range from the pixel subjected to the filter processing. In this example, too, the pixel (pixel of interest) subjected to the filter processing is at a position of (3, 3), and weighting is performed within a range of 5×5 pixels on the front and rear and the right and left of this pixel of interest.

The filter processing is executed by using the image data of the pixels in the range of right and left 5×5 pixels both in FIG. 7A and FIG. 7B, but this is not limiting, and the range may be widened or narrowed. However, in comparison of the peripheral pixels, since they correspond to small bright points, check by the pixel unit is preferable (in the case of check by color, pixels are thinned, and thus the check by color is not preferable). In order to handle a colored object, it is preferable that pixels in the same color are checked, and in this case, the range shall be 5×5 or more.

The filter processing is not limited to the examples in FIG. 7A and FIG. 7B but noise reduction may be performed for the image made of a difference by using the method as disclosed in Japanese Patent No. 5249111. Moreover, the number of the differential pixel values at the predetermined value or more corresponding to the pixels within a predetermined size (5×5, for example) around the pixel of interest may be counted.

Filter processing for detecting only the same color as in another example illustrated in FIG. 11A may be executed as the filter processing. The example illustrated on the left side in FIG. 11A is for R/B when the filter processing is executed for the RGB image data, while the example illustrated on the right side is for Gr/Gb when the filter processing is executed for the brightness-color difference (Y-CbCr) image data.

Moreover, filter processing with emphasis on the same color and detecting a little of the others as in another example illustrated in FIG. 11B may be executed as the filter processing. The upper tier in FIG. 11B is for R and B when the filter processing is executed for the RGB image data, while the lower tier in FIG. 11B is for Gr/Gb when the filter processing is executed for the brightness/color difference (Y-CbCr) image data.

Filter processing with emphasis on any one of specific directions of the pixel of interest as in another example illustrated in FIG. 11C may be executed as the filter processing. The left side in FIG. 11C illustrates the filter processing with an emphasis on upper left, while the right side in FIG. 11C is the filter processing with an emphasis on lower right.

When the filter processing is executed at Step #11, then, composition determination is made (#13). At this Step, availability of composition processing is determined for each pixel of interest on the difference data subjected to the filter processing when the image composition is to be performed. That is, if there is a sudden pixel defect, the image data of only one pixel might show an abnormal value, and in this case, the difference value becomes abnormally large. Thus, in the composition determination, if the difference value subjected to the numerical conversion and filter processing is larger than a predetermined value, it is determined that the pixel of interest has a sudden pixel defect. On the other hand, if the difference value subjected to the numerical conversion and filter processing is smaller than the predetermined value, it is determined that the pixel of interest does not have a sudden pixel defect.

When the composition determination has been made at Step #13, then, composition is performed (#15). Here, the image composition is performed by using the RAW image data A acquired at #1 and the RAW image data B acquired at #3 in accordance with the result of the composition determination at Step #13. That is, since the composition determination (#13) is made for each pixel of the image data, composition processing is not performed for the pixel determined to have a sudden pixel defect in the pixel of interest. On the other hand, in the pixel determined not to have a sudden pixel defect in the pixel of interest, composition processing is executed. The image composition is not limited to lighten composite but composition of one or a plurality of image processing may be performed using a plurality of images such as normal composition, addition composition, addition/averaging composition, dodging composition, screen composition, overlay composition, and darken composite.

At Step #15, when composition has been performed, a composite image is generated (#17). At Step #15, composition is performed for each pixel of interest, and when a composition operation has been finished for all the pixels in a generation region of the composite image, the composite image is completed at Step #17, and the image composition operation in this embodiment is finished.

As described above, in this embodiment, when the composite image is to be generated by using two pieces of image data, a difference value is calculated for each of the corresponding pixels (#5), whether or not there is a sudden pixel defect is determined on the basis of this difference value (#13), and since the pixel determined to be the sudden pixel defect is not used for the composition processing, image quality deterioration caused by the sudden pixel defect can be reduced.

Moreover, in this embodiment, the difference value is numerically converted (#7), and the filter processing is executed (#11). Thus, an influence of noises and the like of the image data can be eliminated, whereby the image quality can be improved. Numerical conversion or the like is performed in this embodiment, but it may be omitted.

Subsequently, a variation of this embodiment will be described by using FIG. 5. In the first embodiment of the present invention, the difference value of the RAW image data is obtained first and then, numerical conversion and filter processing are performed. However, the procedure of the processing is not limited to that, and the order may be changed. The variation illustrated in FIG. 5 shows an example of another processing procedure.

Figure 5:
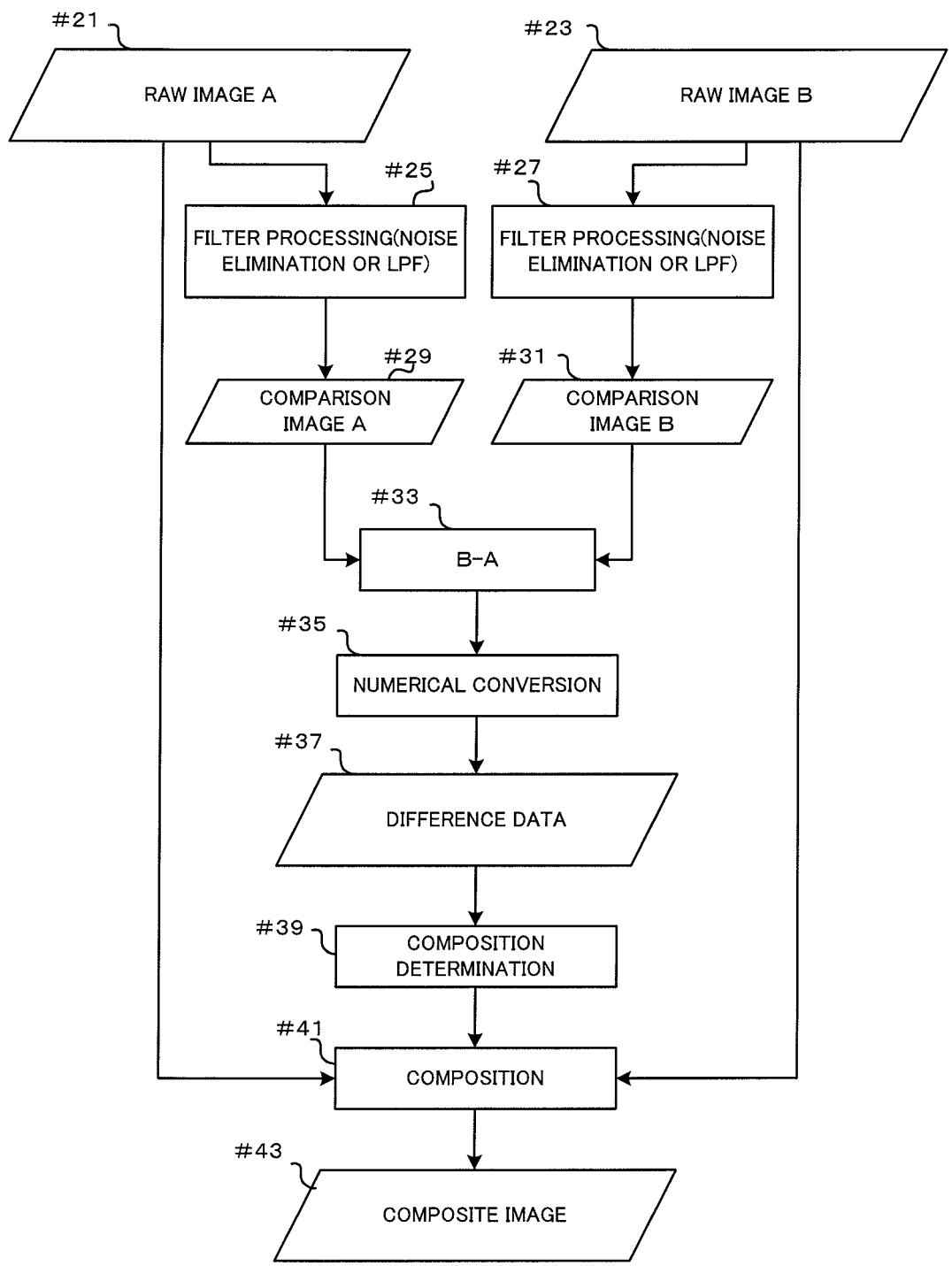
FIG. 5 is a flowchart illustrating a variation of the operation of the camera according to the first embodiment of the present invention.

Entering the flowchart illustrated in FIG. 5, similarly to FIG. 4, the RAW image data A is acquired (#21), and the RAW image data B is acquired (#23).

When the RAW image data A is acquired at Step #21, then, the filter processing is executed for the RAW image data A (#25). Here, the filter processing based on the spatial frequency of the image is executed for the RAW image data A as illustrated in FIG. 7A and FIG. 7B.

When the filter processing has been executed at Step #25, then, a comparison image A is generated (#29). At Step #25, since the filter processing is applied to the image data of all the pixels in a composite image generation target region while the pixel of interest is sequentially changed, the image data subjected to filter processing is sequentially stored at this Step, and image data for the comparison image A is generated.

When the RAW image data B has been acquired at Step #23, then, the filter processing is executed for the RAW image data B (#27). Here, the filter processing based on the spatial frequency of the image is executed for the RAW image data B as illustrated in FIG. 7A and FIG. 7B.

When the filter processing has been executed at Step #27, then, a comparison image B is generated (#31). At Step #27, since the filter processing is applied to the image data of all the pixels in the composite image generation target region while the pixel of interest is sequentially changed, the image data subjected to filter processing is sequentially stored in the internal memory 33 or the recording section 11 at this Step, and image data for the comparison image B is generated.

When the comparison image A has been generated at Step #29, or when the comparison image B has been generated at Step #31, then, a difference (B-A) between the comparison image data B and the comparison image data A is calculated (#33). Here, the subtraction processing section 13 obtains a difference value of the image data of the respective corresponding pixels for the comparison image data A and B stored in the internal memory 33 or the recording section 11.

When the difference value of the image data of the corresponding pixel has been obtained, then, numerical conversion is performed (#35). Here, similarly to Step #7, the numerical conversion section 14 performs numerical conversion by using the difference value calculated by the subtraction processing section 13. This numerical conversion is performed for conversion as illustrated in FIG. 6A and FIG. 6B, for example.

When the numerical conversion is performed at Step #35, then, the difference data is stored (#37). The difference value of the image data has been calculated for each corresponding pixel at Steps #33 and #35, and numerical conversion has been performed and thus, the data after numerical conversion of each pixel is sequentially stored in the internal memory 33 or the recording section 11 at this Step.

When the difference data has been generated at Step #37, then, the composition determination is made (#39). At this Step, similarly to Step #13, it is determined whether or not the composition processing of the image data is to be executed for each pixel of interest in executing the image composition on the basis of the difference data subjected to the filter processing and the numerical conversion. In the composition determination, if the difference value is larger than a predetermined value, it is determined that the pixel of interest has a sudden pixel defect. On the other hand, if the difference value is smaller than the predetermined value, it is determined that the pixel of interest does not have a sudden pixel defect.

At Step #39, the composition determination is made and then, composition is performed (#41). Here, similarly to #15, image composition is performed in accordance with the result of composition determination at Step #39 using the RAW image data A acquired at #21 and the RAW image data B acquired at #23.

When composition is performed at Step #41, a composite image is generated (#43). At Step #41, composition is performed for each pixel of interest, and when a composition operation has been finished for all the pixels in the generation region of the composite image, the composite image is completed at Step #43, and an image composition operation in this variation is finished.

As described above, in this variation, too, in generating a composite image by using two pieces of image data, the difference value is calculated for each of the corresponding pixels (#33), whether or not there is a sudden pixel defect is determined on the basis of this difference value (#39), and the composition processing is executed for the pixel without the sudden pixel defect. Thus, image quality deterioration caused by the sudden pixel defect can be reduced.

Moreover, in this variation, comparison image data is generated by filter processing (#25 to #31) and numerical conversion is performed (#35). Thus, an influence of noises of the image data and the like can be eliminated, and the image quality can be improved. Moreover, since the RAW image A is composited image data and the RAW image B is the image data before composition, noise characteristics of the both image data might be different. In this variation, the filter processing can be made different between the RAW image data A and the RAW image data, which is advantageous in noise elimination.

Subsequently, a second embodiment of the present invention will be described by using FIG. 8. In the first embodiment of the present invention, the influence of the image data of the pixels in the periphery of the pixel of interest is considered by including it in the filter processing. On the other hand, in this embodiment, determination on whether or not the composition processing is to be executed is made in accordance with the difference value and an output of the peripheral pixels.

Figure 2:
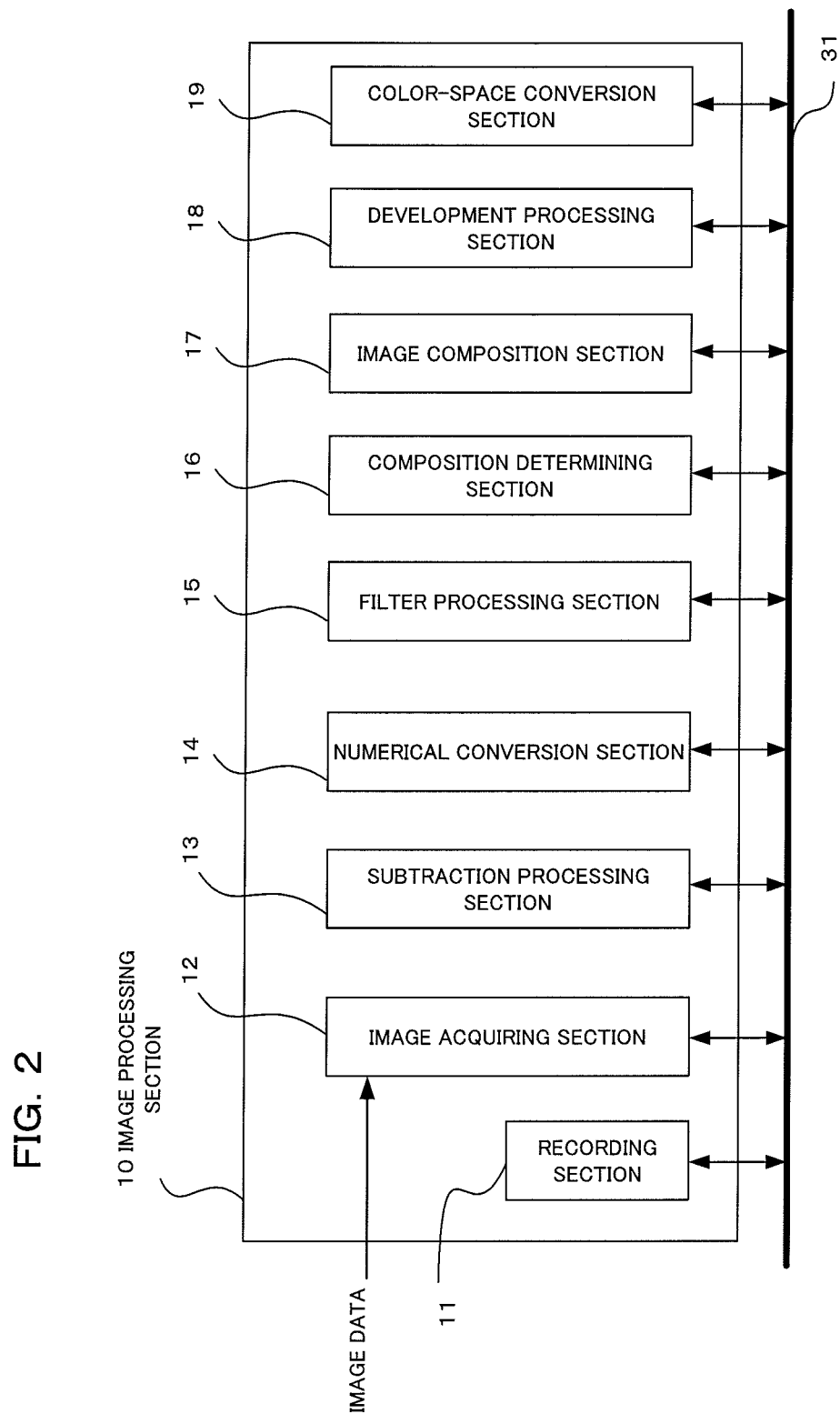
FIG. 2 is a block diagram illustrating details of an image processing section of the camera according to the first embodiment of the present invention.

Since a configuration in this embodiment is similar to the block diagrams illustrated in FIG. 1 and FIG. 2, detailed description will be omitted. A flowchart illustrated in FIG. 8 (and a flowchart illustrated in FIG. 9 which will be described later, too) is executed by the CPU in the system control section 20 by controlling each section in accordance with the program stored in the internal memory 33. In this embodiment, a case of lighten composite is to be performed as image processing will be described.

Figure 8:
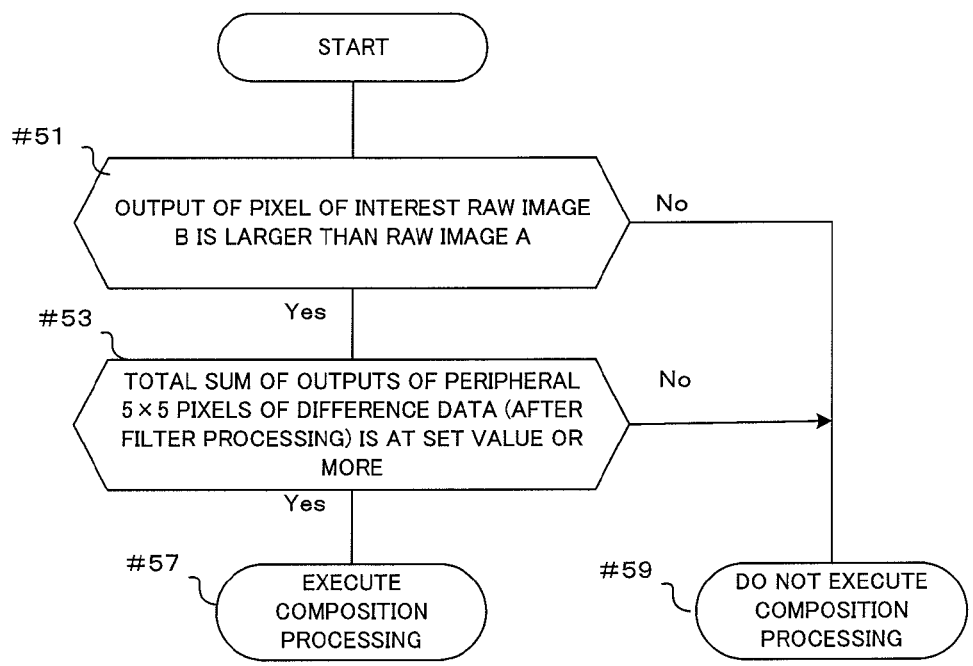
FIG. 8 is a flowchart illustrating an operation of a camera according to a second embodiment of the present invention.

Entering the flowchart illustrated in FIG. 8, first, it is determined whether the RAW image data B is larger than the RAW imaged data A for an output of the pixel of interest (#51). In this embodiment, too, the RAW image data A is composited image data, and the RAW image data B is the image data before composition. At this Step, the image acquiring section 12 acquires the RAW image data A and the RAW image data B, the subtraction procession section 13 makes subtraction calculation, and the composition determining section 16 determines whether or not the RAW image data B is larger than the RAW image data A for the pixel of interest on the basis of this calculation result. It may be so configured that a size relationship is determined directly without making subtraction calculation.

If the RAW image data B is larger than the RAW image data A as the result of determination at Step #51, then, it is determined whether or not the total sum of the outputs of the peripheral 5×5 pixels of the difference data after the filter processing is at a set value or more. If the difference between the composited image data and the image data before composition at the pixel of interest is large, it may be simply because the value of the image data before composition is large, but it is likely to be a sudden pixel defect. Thus, it is determined whether or not there is a pixel defect on the basis of the outputs of the peripheral pixels in the pixel of interest at this Step.

That is, if a sudden pixel defect occurs, the value of the image data of the peripheral pixels of the pixel of interest does not become large, while if it is not a sudden pixel defect but incidence of bright object light to the pixel of interest, the value of the image data of the peripheral pixels of the pixel of interest becomes large. Thus, determination is made by obtaining the total sum of the image data of the peripheral pixels of the pixel of interest. In this embodiment, the total sum of the image data of 5×5 (that is, the peripheral 25 upper and lower and right and left pixels) as the peripheral pixels of the pixel of interest is obtained, but 5×5 is not limiting, and the total sum may be obtained for a wider range or a smaller range. The total sum does not necessarily have to be simple addition but may be addition of square values or other calculation formulas may be used.

If the total sum of the outputs of the peripheral pixels is at the set value or more as the result of determination at Step #53, composition processing of the pixel of interest is performed (#57). Here, in image composition by the image composition section 17, composition processing of the pixel of interest of the RAW image data A is performed. That is, since the value of the pixel of interest of the RAW image data B is larger than the value of the pixel of interest of the RAW image data A (Yes at #51) as the result of determination at Step #53, it is likely to be a sudden pixel defect, but since the value of the image data of the peripheral pixels is also large as the result of the determination at Step #53, it is determined not to be a sudden pixel defect.

Moreover, if the pixel of interest of the RAW image data B is not larger than the pixel of interest of the RAW image data A as the result of the determination at Step #51 (No at #51), or if the total sum of the outputs of the peripheral pixels is not at the set value or more as the result of the determination at Step #53 (No at #53), composition processing of the pixel of interest is not executed (#59). This is because, if the pixel of interest of the RAW image data B is not larger than the pixel of interest of the RAW image data A (No at #51), it is not suitable for processing of selecting that with a higher level to remain as the processing of lighten composite and if the total sum of the outputs of the peripheral pixels is not at the set value or more in the determination at Step #53, the pixel of interest can be considered to be a sudden pixel defect.

When it is determined whether the composition processing of the image data of the pixel of interest is to be executed in the flow in FIG. 8, the image composition section 17 performs image composition in accordance with the result of composition determination of each pixel.

As described above, in the second embodiment of the present invention, if the pixel of interest is likely to be a sudden pixel defect as the result of determination at Step #51, it is determined whether or not the sudden pixel defect occurs on the basis of the outputs of the pixels in the periphery of the pixel of interest.

Figure 9:
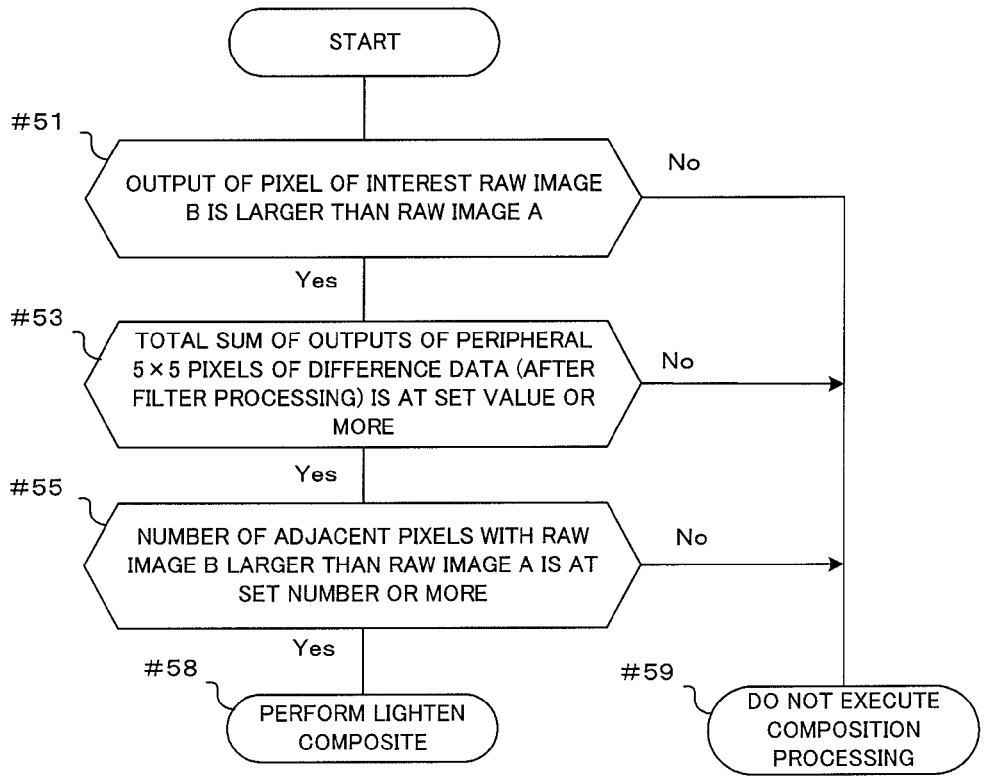
FIG. 9 is a flowchart illustrating a variation of the operation of the camera according to the second embodiment of the present invention.

Subsequently, a variation of the second embodiment will be described by using FIG. 9. Since this variation has Step #55 further added to the flow illustrated in FIG. 8, this added step #55 will be described.

If the total sum of the outputs of the peripheral pixels is at the set value or more as the result of determination at Step #53, then, it is determined whether or not the number of adjacent pixels with the RAW image data B larger than the RAW image data A is at a set number or more (#55). The adjacent pixels at this Step refer to the adjacent pixels closest to the pixel of interest (therefor, within a range of 3×3 pixels). Here, a difference value in the image data between the pixel of interest and each of the peripheral pixels is obtained by the subtraction processing section 13, and the number of the adjacent pixels with the larger image data of the composited image is obtained and determined on the basis of this difference value. If the possibility of a sudden pixel defect is low, the value of the image data of the directly adjacent peripheral pixel is substantially equal to the value of the image data of the pixel of interest.

If the number of adjacent pixels with the value of the RAW image data B larger than the value of the RAW image data A is at the set number or more as the result of determination at Step #55, lighten composite is performed (#58). In addition to the determination results at Steps #51 and #53, as the result of the determination at Step #55, since it is less likely that the pixel of interest is a sudden pixel defect, lighten composite is performed. On the other hand, if the number of adjacent pixels with the value of the RAW image data B larger than the value of the RAW image data A is not at the set number or more, composition processing is not executed (#59). This is because it is likely that the pixel of interest is a sudden pixel defect in this case.

As described above, in addition to the determination in the second embodiment, whether or not the sudden pixel defect has occurred is determined on the basis of a relationship between the pixel of interest and the adjacent pixel. Thus, determination with higher accuracy can be made.

Moreover, in this variation, check on whether or not a pixel at a level higher than the pixel to be compared is adjacent with respect to the peripheral pixel of the pixel of interest is added (#55). By checking the adjacent pixel, an influence caused by a random noise can be reduced.

Figure 10A:
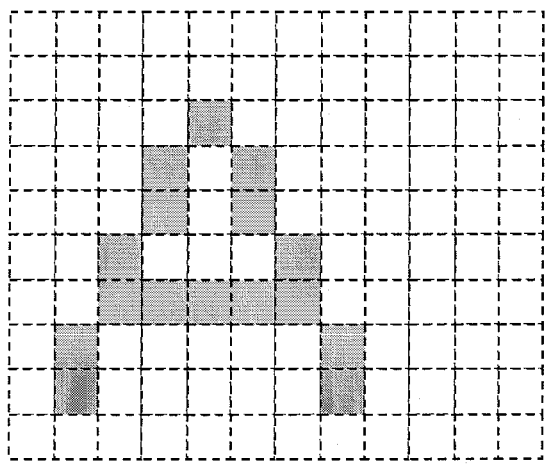
FIGS. 10A to 10C are views for explaining pixel alignment of two images in the cameras in the first and second embodiments of the present invention.
Figure 10B:
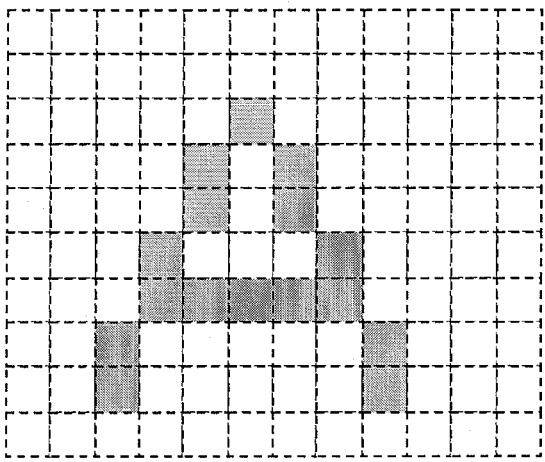
Figure 10C:
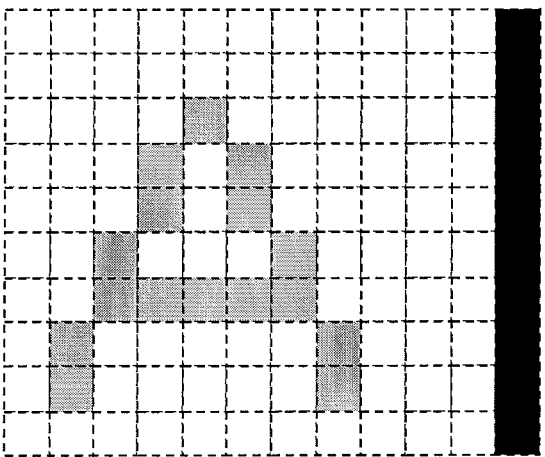

Subsequently, alignment of pixels of two images in the first embodiment and the second embodiment of the present invention will be described by using FIGS. 10A to 10C. In these embodiments, an "image 1" illustrated in FIG. 10A and an "image 2" illustrated in FIG. 10B are used, and image composition is performed by the two images. When the "image 2" is acquired, it might be shifted by one pixel as illustrated in FIG. 10B. In this case, the shift from the "image 1" is detected, processing for shifting the "image 2" by one pixel as illustrated in FIG. 10C is executed and then, a difference value is obtained by the subtraction processing section 13.

The detection of a shift may be also determined from an image or may be determined on the basis of information from a shift detection section such as a gyro sensor. In the example illustrated in FIGS. 10A to 10C, correction is made for the "image 2", but the "image 1" may be corrected. Moreover, in an area in which the image data runs short by shifting of a pixel for correction, in the case of lighten composite, it is made black data as illustrated in FIG. 10C, and in the case of darken composite, it is made white data.

As described above, in each of the embodiments and variations of the present invention, the image acquiring section 12 for acquiring the first image data and the second image data, the subtraction processing section 13 for obtaining a difference value for each pixel for at least a part of the first image data and at least a part of the second image data, the filter processing section 15 for executing filter processing based on the spatial frequency of an image with respect to this difference value, and the image composition section 17 for compositing at least a part of the first image data with at least a part of the second image data on the basis of the difference value and the filter processing output are provided. Thus, even if there is a sudden pixel defect, it can be efficiently detected, and the influence of the pixel defect can be eliminated.

As described in Background of the Invention, if there is a sudden detective pixel is present when a plurality of pieces of image data is to be composited, the image quality of the composite image deteriorates. If the technology proposed in Patent Literature 3 is used in order to solve this, it is less effective if the number of photographed images for detection of a defective pixel is small, while it takes time to detect a sudden pixel defect if the number of photographed images is large. If the technology proposed in Patent Literature 4 is used, if an edge portion between light and dark sides of an object is averaged, the level rises, which results in miscorrection. Moreover, since only the same color is detected, small objects such as a star might be determined as a defect. Therefore, in the prior arts, a sudden pixel defect could not be detected efficiently, if any, and the influence of the pixel defect could not be eliminated. However, in each of the embodiments and variations of the present invention, even if there is a sudden pixel defect, it can be efficiently detected, and the influence of the pixel defect can be eliminated.

In each of the embodiments and the variations of the present invention, the subtraction processing, numerical conversion, filter processing and the like of the image data are executed by using the RGB image data. However, this is not limiting, and it may be so configured that brightness (Y) image data is generated from the RGB image data and the subtraction processing, numerical conversion, filter processing and the like is executed by using this brightness image data or that a part is executed by using the RGB image data while the other by the brightness image data. In the case of the RGB image data, calculation is made between the pixels in the same color, while by using the brightness image data, processing can be executed whether the pixels are in different colors or not.

In the case of lighten composite, if the level of the pixel of interest is higher than that of the comparison composite image, it may be so configured that the level of the peripheral pixel is checked, the number of pixels at a level higher than that of the image during composition (to be compared) is counted, and if the count is not less than a number set in advance, the pixel of interest is subjected to composition processing. Since the level of the peripheral pixel is considered, a sudden pixel defect can be detected with accuracy. Moreover, for the pixel recognized to be a sudden pixel defect, a method of simply not executing the composition processing or a method of interpolation using pixel information of the periphery may be used.

Moreover, in this embodiment, a digital camera was used as equipment for photographing in description but the camera may be a digital single-lens reflex camera or a compact digital camera, a camera for moving pictures such as a video camera and a movie camera or a camera built in a mobile phone, a smart phone, a personal digital assist (PDA), a personal computer (PC), a tablet computer, a game device and the like. In any case, the present invention can be applied to any device for performing image composition by using a plurality of pieces of image data.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An image composition apparatus comprising:
   an image acquiring section for acquiring first image data and second image data continuously;
   a subtraction processing section for obtaining a difference value for each pixel for at least a part of the first image data and at least a part of the second image data;
   a filter processing section for applying filter processing based on a spatial frequency of an image to the difference value for each pixel;
   a sudden pixel defect detection section for determining, for each pixel, whether or not there is a sudden pixel defect on the basis of the difference value for each pixel after the filter processing to output a result of the determination for each pixel by comparing the difference value of each pixel with a predetermined value; and
   an image composition section for, for each pixel,
      compositing, responsive to a determination of no sudden pixel defect of the pixel, the corresponding pixel of the first image data with the corresponding pixel of the second image data, and
      otherwise, responsive to a determination of sudden pixel defect of the pixel, not compositing the corresponding pixel of the first image with the corresponding pixel of the second image.

2. The image composition apparatus according to claim 1, further comprising:
   a numerical conversion section which gives a numerical value on the basis of whether or not the difference value for each pixel has exceeded a predetermined threshold value or gives a numerical value on the basis of a predetermined conversion characteristic based on the difference value for each pixel, wherein
   the filter processing section uses the numerical value given by the numerical conversion section and a numerical value given by the numerical conversion section of peripheral pixels for determination of composition processing.

3. The image composition apparatus according to claim 1, wherein
   the filter processing section performs weighting according to a distance from the pixel subjected to the filter processing, on a difference of the first image data and the second image data.

4. The image composition apparatus according to claim 1, wherein
   the subtraction processing section obtains a difference value for each pixel in the same color.

5. The image composition apparatus according to claim 1, wherein
   at least one of the first image data and the second image data is image data in Bayer array, and wherein
   the image composition apparatus further comprises:
   a development processing section executing interpolation processing of the image data in Bayer array; and
   a color-space conversion section for obtaining at least a brightness value of the pixel subjected to the interpolation processing are further provided,
   the subtraction processing section at least acquiring a difference of pixel values output by the development processing section or acquiring a difference of brightness values for each pixel output by the color-space conversion section.

6. The image composition apparatus according to claim 1, wherein
   composition in the image composition section is composition using a plurality of pieces of the image data and at least one of image processing of normal composition, addition composition, addition/averaging composition, lighten composite, dodging composition, screen composition, overlay composition, and darken composite.

7. The image composition apparatus according to claim 1, further comprising:
   a display section which outputs and displays image data composited by the image composition section.

8. The image composition apparatus according to claim 1, further comprising:
   a recording section which holds and outputs the image data;
   an optical system which forms an object image; and
   an image pickup section picking up the object image formed by the optical system and outputting the result as second image data, wherein
   the recording section records the image data composited by the image composition section.

9. An image composition apparatus comprising:
   an image acquiring section for acquiring first image data and second image data continuously;
   a filter processing section for applying filter processing based on a spatial frequency to the first image data and the second image data; and a subtraction processing section for obtaining a difference value for each pixel for at least a part of an output of the filter processing of the first image data and a filter output of the second image data by the filter processing section;

a sudden pixel defect detection section for determining, for each pixel, whether or not there is a sudden pixel defect on the basis of the difference value of the corresponding pixel; and an image composition section for, for each pixel,
compositing, responsive to a determination of no sudden pixel defect of the pixel, the corresponding pixel of the first image data with the corresponding pixel of the second image data, and
otherwise, responsive to a determination of sudden pixel defect of the pixel, not compositing the corresponding pixel of the first image with the corresponding pixel of the second image.

10. An image composition method comprising:

an image acquiring step of acquiring first image data and second image data continuously;

a difference value acquiring step of acquiring a difference value for each pixel for at least a part of the first image data and at least a part of the second image data;

a filter processing step of applying filter processing based on a spatial frequency of an image to the difference value for each pixel;

a sudden pixel defect detection step of determining, for each pixel, whether or not there is a sudden pixel defect on the basis of the difference value of the corresponding pixel; and a composition step of, for each pixel,
compositing, responsive to a determination of no sudden pixel defect of the pixel, the corresponding pixel of the first image data with the corresponding pixel of the second image data, and
otherwise, responsive to a determination of sudden pixel defect of the pixel, not compositing the corresponding pixel of the first image with the corresponding pixel of the second image.

11. The image composition method according to claim 10, wherein
at least one of the first image data and the second image data is image data in Bayer array, wherein
the image composition method further comprises:
an interpolation processing step of applying interpolation processing to the image data in Bayer array; and
a brightness value acquiring step of acquiring at least a brightness value of the pixel subjected to the interpolation processing, and wherein
the difference value acquiring step executes at least one of acquisition of a difference value for each pixel in the same color, acquisition of a difference value based on whether a predetermined threshold value is exceeded or not, acquisition of a difference value based on a predetermined function, acquisition of an RGB value for each pixel subjected to the interpolation processing, and acquisition of a difference value of the brightness value for the each pixel;

the filter processing step performs weighting according to a distance from the pixel to be subjected to the filter processing; and the composition step is composition using a plurality of pieces of image data and executes at least one of image processing of normal composition, addition composition, lighten composite, addition/averaging composition, dodging composition, screen composition, overlay composition, and darken composite.

12. The image composition method according to claim 10, executing at least one of:
a display step of outputting and displaying the image data composited in the composition step; and
an output step of holding and outputting the first image data, picking up an object image and outputting the result as the second image data, and outputting the composited image data.

13. A non-transitory computer-readable medium storing a computer program for controlling a computing device for image composition, comprising:

an image acquiring step of acquiring first image data and second image data continuously;

a difference value acquiring step of acquiring a difference value for each pixel for at least a part of the first image data and at least a part of the second image data;

a filter processing step of applying filter processing based on a spatial frequency of an image to the difference value for each pixel;

a sudden pixel defect detection step of determining, for each pixel, whether or not there is a sudden pixel defect on the basis of the difference value of the corresponding pixel; and a composition step of, for each pixel,
compositing, responsive to a determination of no sudden pixel defect of the pixel, the corresponding pixel of the first image data with the corresponding pixel of the second image data, and
otherwise, responsive to a determination of sudden pixel defect of the pixel, not compositing the corresponding pixel of the first image with the corresponding pixel of the second image.

14. The image composition apparatus according to claim 1, wherein a sudden pixel defect is due to a temporarily defective pixel element in an image pickup element of the image acquiring section.

15. The image composition apparatus according to claim 9, wherein a sudden pixel defect is due to a temporarily defective pixel element in an image pickup element of the image acquiring section.

16. The image composition method according to claim 10, wherein a sudden pixel defect is due to a temporarily defective pixel element in an image pickup element of an image acquiring section that was used to acquire the first image data and the second image data.

17. The non-transitory computer-readable medium according to claim 13, wherein a sudden pixel defect is due to a temporarily defective pixel element in an image pickup element of an image acquiring section that was used to acquire the first image data and the second image data.

* * * * *